United States Patent [19]

Raguseo

[11] Patent Number: 5,784,008
[45] Date of Patent: Jul. 21, 1998

[54] WORD PROCESSING

[75] Inventor: Domenico Raguseo, Pomezia, Italy

[73] Assignee: International Business Machines Corp., Armonk, N.Y.

[21] Appl. No.: 853,844

[22] Filed: May 9, 1997

[30] Foreign Application Priority Data

Jun. 3, 1996 [GB] United Kingdom ............ 9611510

[51] Int. Cl.$^6$ ............ H03K 17/94; H03M 11/00
[52] U.S. Cl. ............ 341/20; 341/22; 341/23; 345/168; 400/485; 707/531; 707/534
[58] Field of Search ............ 341/20, 22, 23; 345/168; 400/485; 707/534, 531, 532, 533

[56] References Cited

U.S. PATENT DOCUMENTS

| | | | |
|---|---|---|---|
| 3,355,714 | 11/1967 | Culler | 341/20 |
| 4,559,598 | 12/1985 | Goldwasser et al. | 707/531 |
| 5,218,538 | 6/1993 | Zjamg | 707/534 |
| 5,621,641 | 4/1997 | Freeman | 341/20 |
| 5,649,223 | 7/1997 | Freeman | 341/20 |
| 5,664,896 | 9/1997 | Blumberg | 707/534 |

FOREIGN PATENT DOCUMENTS 0 129 423  12/1984  European Pat. Off. .

*Primary Examiner*—Michael Horabik
*Assistant Examiner*—Timothy Edwards, Jr.
*Attorney, Agent, or Firm*—A. Bruce Clay

[57] ABSTRACT

A method and system for inputting text in a word processing system. A set of words is assigned to predetermined specific keys for later quick input. The set of words is dynamically changed during the input of the text, taking into account variable parameters such as the frequency of the words within the text and the difficulty of typing of the words.

10 Claims, 4 Drawing Sheets

FIG. 3

| y\x | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 4 |  | 1 | 2 | 3 | 4 | 5 | 6 | 7 | 8 | 9 | 0 | - | = | ↓ |
| 3 | ↓↑ | Q | W | E | R | T | Y | U | I | O | P | { | } | ↵ |
| 2 | Caps Lock | A | S | D | F | G | H | J | K | L | ; | ' | # |  |
| 1 | ↑ | \ | Z | X | C | V | B | N | M | < | > | ? | ← |  |
| 0 | Ctrl | Alt | Space | | | | | | | | | | Alt | Ctrl |

LEFT HAND | RIGHT HAND

1

WORD PROCESSING

TECHNICAL FIELD

The present invention relates to a method and system for inputting strings of characters.

BACKGROUND

In word processing systems and in all those systems requiring frequent inputs, a demand exists for speeding the input operations.

Usually the input operations are performed by acting on a keyboard like the one shown in FIG. 2. The user shall input the words character-by-character by pressing the keys corresponding to the single characters. Sometimes more than one key is needed to input a single character.

Most of the available word processing systems provide the user with the option of defining a limited set of words or of sequences of characters which are likely to be most frequently used. Each of these predefined strings of character or sequences of keys is assigned to a particular key, for example referring to FIG. 2 to the keys F1, F2, ..., F12. In this way a long string of character can be input by pressing only one key.

The choice of the set of predefined words is usually made by the user, but could also be provided by the system itself according to default standards which can change according to specific arguments or applications.

However, even if the set is accurately chosen and defined by the user, this could result (and it usually does) in a non-optimal choice due to conditions which may vary during the input of the text. The definition is made before starting the input of the words and it is usually not easy to forsee and to evaluate the set of words for which a quick input could be most desirable. Anyway, a set of words which is optimal at the beginning of the text may not be so good later on in view of modified conditions: a word may be used frequently in a concentrated part of the text and never used in the rest of the text.

The only solution available with the known systems would be to redefine the set of words assigned to the functional keys when the user realises that it is no longer reflecting the actual conditions. Of course this option would be time consuming and also would not guarantee that an optimal setting is defined.

It is an object of the present invention to provide a technique which alleviates the above drawbacks.

SUMMARY OF THE INVENTION

According to the present invention we provide a method for inputting a text in an electronic word processing system comprising input means having a plurality of keys $k_i$ for inputting the text, the text being in the form of a sequence of words $W_j=(c_1, c_2, \ldots, c_n)$, the method comprising the steps of:

defining a limited set of words $W_j$;

associating each one of the limited set of words to a specific key for a later quick input; characterized in that the definition of the set of words and the association of each word to a specific key are dynamically changed during the input of the text, according to at least one parameter, the at least one parameter being variable during the input of the text.

Further, according to the present invention, we provide a word processing system comprising:

input means having a plurality of keys $k_i$ for inputting the text, the text being in the form of a sequence of words $W_j=(c_1, c_2, \ldots, c_n)$ ;

means for defining a limited set of words $W_j$;

means for associating each one of the limited set of words to a specific key for a later quick input, the definition of the set of words and the association of each word to a specific key being dynamically changed during the input of the text, according to at least one parameter, the at least one parameter being variable during the input of the text.

In this way a method is realised which automatically modifies the set of words for which a quick input is provided, taking into account the evolution in the set of words used by the user.

BRIEF DESCRIPTION OF THE DRAWINGS

The above and other advantages of the present invention will be better understood with reference to the following figures, where:

FIG. 3 is a schematical Cartesian-like representation of a keyboard, used in a preferred embodiment of the present invention;

DETAILED DESCRIPTION OF THE PREFERRED EMBODIMENT

Figure 1:
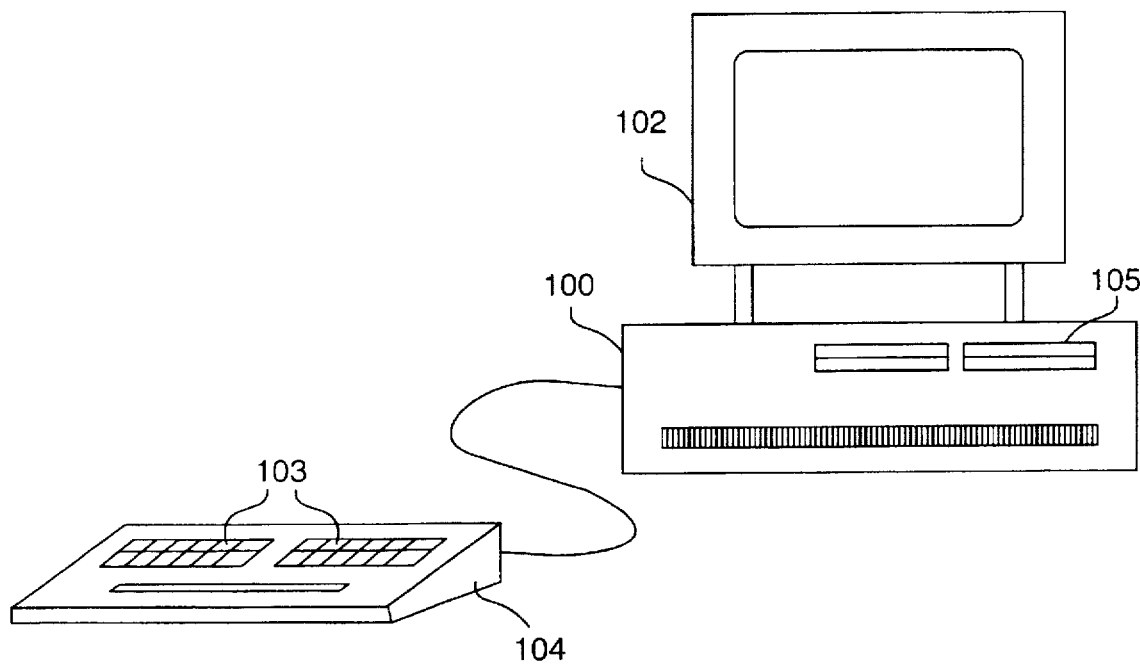
FIG. 1 is a data processing system implementing the method according to a preferred embodiment of the present invention.

FIG. 1 shows a data processing system which, according to a preferred embodiment, implements the inputting method of the present invention. The data processing system comprises a personal computer 100, display means 102 and keyboard means 104. The personal computer 100 is programmed to receive data input from keyboard 104 and store the data in a suitable form in the disk storage device 105 of the personal computer 100. The data processing system receives input from the keyboard and generates a sequence of words which are recorded either by being stored in the workstation or passed to an application program, such as a data base program or word processing program, which may be running either in the personal computer itself or in another computer, in this latter case the words being passed to the program over a suitable data communications network.

Whilst, in this embodiment, the invention is implemented using an appropriately written computer program executing on a general purpose computer, it will be recognised that the invention could be implemented using dedicated hardware or by any combination of hardware and software.

Figure 2:
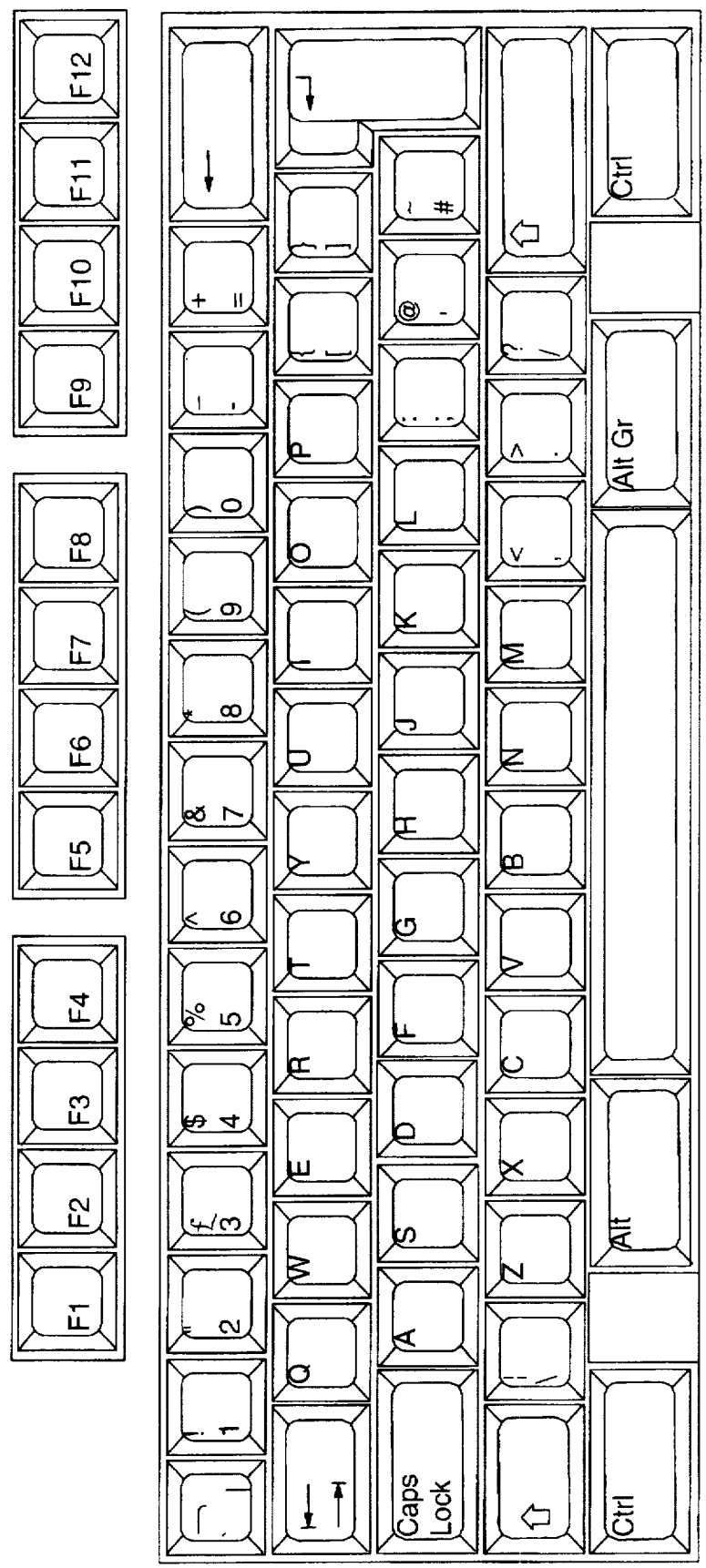
FIG. 2 is a schematical view of a keyboard.

FIG. 2 shows a keyboard 104 according to a preferred embodiment. The keyboard 104 has a plurality of keys which are pressed by a user for inputting the characters and a series of functional keys (F1, F2, ... F12), which are used for the quick input of a limited set of words.

According to a preferred embodiment, the choice of the set of words to be assigned to the quick keys is made considering two parameters which are defined as the "difficulty" of the words and the frequency with which the words appears in the text. However, other parameters could be taken as a rule for the choice of the set of words, such as, for example the frequency of the words determined considering only a limited portion of the text to better fit the possible changes during the input of the text. Another possible parameter could be the length of the words. Of course a combination of more than one parameter is a possible alternative.

It should be evident that by using a variable parameter like the frequency of each word in the text, the set of words for which a quick input is available, automatically varies during the input of the text, guaranteeing that the words in the set are actually the most frequently used. For this reason the set of "quick" words actually in use shall be reminded to the user, for example by displaying the functional keys and the associated word on a predefined portion of the display 102.

As mentioned above the "monitoring" of the set can take into account that a word frequently used at the beginning of the text could not be so frequently used in a later stage. For example the frequency could be evaluated on a limited "window" of the text.

The second parameter, the difficulty of the word, gives each word a weight, which is used to "adjust" the frequency importance on the choice of the set. Without this weight it could happen that a frequently used word, but very easy to be written (e.g. a very short word, one or two characters long) is preferred to a much more "difficult" word, frequently used, but not so frequently like the other one.

The difficulty of a word may not be an absolute value: a word which is difficult under certain circumstances may be easier under other circumstances. Usually, the longer a word is the more "difficult" to be written it is, but also the relative position of the keys on the keyboard is an important aspect, which may affect the difficulty of a string of characters. If the displacement on the keyboard of the keys of two consecutive characters within a string makes uneasy to move from one key to the other, the string difficulty results to be increased.

However, other elements must be considered. For example the different arrangement of the keys on the keyboard (e.g. for different languages) may influence the difficulty of a word. Another important factor can be the skill of the user in typing on a keyboard. The concept of difficulty can change dramatically depending on whether the user is a skilled typist or not: an unskilled user, for example, who employs only one finger for each hand, usually finds it easier to type two keys placed in the opposite halves of the keyboard than two adjacent keys.

The person skilled in the art will appreciate that the difficulty parameter can be customized to fit the different requirements of the users. An option would be to provide a set of different profiles according to different skills and different keyboards. Any user, before starting writing, should be able to choose the profile which suits his needs.

In the following example we considered an English keyboard as the one shown in FIG. 2, used by a low-skilled user who employs only one finger per hand. Therefore we considered the keyboard ideally divided in two halves: one under the control of the left hand, the other one under the control of the right hand. For a skilled typist another division of the keyboard should be used in order to reflect the real weight of the relative position of keys.

As shown in FIG. 3 a sort of "Cartesian-like" reference table is mapped on the keyboard 104, assigning to each key on the keyboard a pair of numbers. This pair of numbers is treated just like the Cartesian coordinates of a point on a plane. So the key "Ctrl" is in the "origin" of our Cartesian system representing the keyboard and it will be referenced with pair (0,0).

With such a reference system it is possible to use the usual two dimensional Cartesian rules, for example, to evaluate the "distance" between two keys. This is useful for establishing the movement that the user's finger requires for pressing the keys of two consecutive characters.

The difficulty of a string of characters will be strictly related to the relative positions of the keys representing each pair of consecutive characters within the string.

We define the function difficulty of the n characters word $W$, where $W=(C_1, C_2, \ldots, C_n)$, as:

$$D(W) = SUM(move(c_i, c_{i+1})) \text{ with } i=1 \text{ to } n$$

where the function $move(k_1, k_2)$ is:

| | |
|---|---|
| $= sqrt((x_2 - x_1)^2 + (y_2 - y_1)^2) + 1$ same keyboard; | if $k_1$ and $k_2$ are on the half of the |
| $= 1$ opposite | if $k_1$ and $k_2$ are on halves of the keyboard | where $k_1$ and $k_2$ are two keys on the keyboard and $(x_1, y_1)$ and $(x_2, y_2)$ are their coordinates on the Cartesian reference system of FIG. 2.

In the preferred embodiment the keys $k_1$ and $k_2$ are considered to be on the same half of the keyboard if the following inequality is satisfied:

$$(x_2 - h) * (x_1 - h) > 0$$

where h is a constant indicating the position of the ideal half line on the reference system. In the example shown in FIG. 2, h can have any value greater than 6 and less than 7, for example 6.5.

If $x_1$ and $x_2$ are both less or both greater than h the inequality is satisfied and this means that the keys $k_1$ and $k_2$ are on the same half of the keyboard, otherwise they are on two opposite halves.

As an example, let's compare two strings of characters and evaluate their difficulty, using the above formulas. The two strings are "si" and "sa".

$$D(s,i) = 1$$

because $move((2,2),(8,3)) = 1$ since $(2-6.5)*(8-6.5) < 0$ $$D(s,a) = sqrt((2-1)^2 + (2-2)^2) + 1 = 2$$

This means that "sa" has a difficulty double than "si". So in case we use the "difficulty" parameter as a simple weight for the frequency, "si" will be preferred to "sa" in the assignment to the quick keys only if its frequency is double than "sa". Of course other adjustments can be added to increase or decrease the weight of the frequency of the words.

Figure 4:
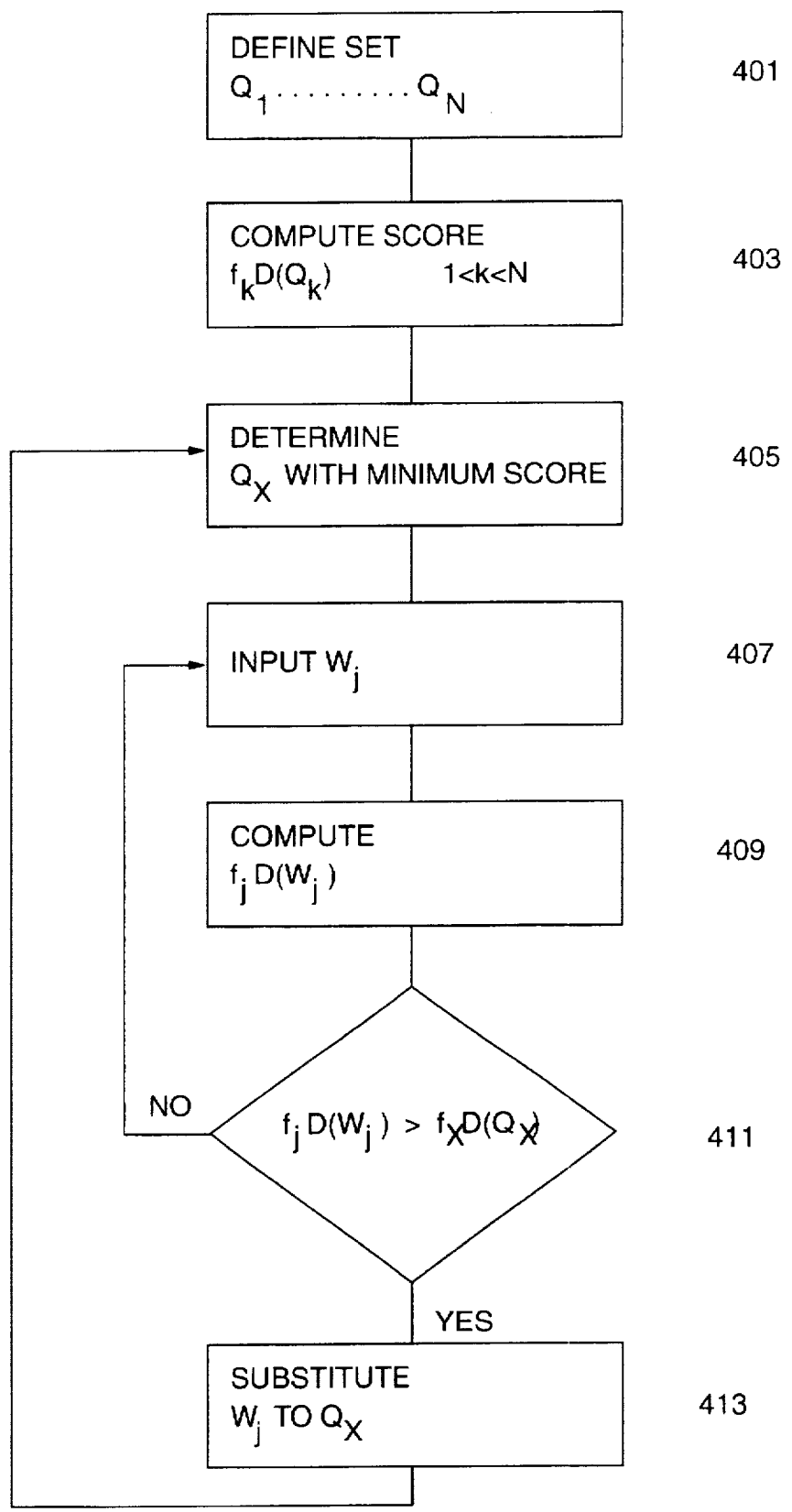
FIG. 4 is a diagram of a process implementing the method according to a preferred embodiment of the present invention.

Referring now to FIG. 4, a process for implementing the method according to a preferred embodiment is shown. At step 401 the initial set of "quick" words $Q_1, \ldots, Q_N$ is defined. Step 403 computes for each word $Q_k$ the score of $f_k D(Q_k)$ where $1 < k < N$, which is the difficulty of the word $Q_k$ according to the function Difficulty described above, weighted with the frequency $f_k$ of the word in the text. At step 405 the word $Q_x$ having the lowest score is determined. When a new word $W_j$ is input (step 407) the score of $f_j D(W_j)$ is computed (step 409). This value $f_j D(W_j)$ is compared with $f_x D(Q_x)$ at step 411: if it is greater, the word $W_j$ is substituted to $Q_x$ in the set of the quick words (step 413) and the process goes back to step 405; otherwise the process repeats step 409 and another word is input.

I claim:

1. A method of dynamically creating a most frequently used word set for outputting text in an electronic word processing system comprising input means having a plurality of keys $k_i$ for inputting the text, the text being in the form of a sequence of words $w_j=(c_1, c_2, \ldots, c_n)$, the method comprising the steps of:

inputting text;

dynamically defining according to at least one variable parameter a limited set of words found in said text as said text is being inputted;

associating each word of the limited set of words to a specific key; and dynamically changing said associating as said limited set of words changes in accordance with said at least one variable parameter, whereas one of the specfic keys is used to output the word associated therewith.

2. The method of claim 1 further comprising the step of displaying the set of words associated to specific keys.

3. The method of claim 1 wherein the at least one parameter comprises the frequency of the words in the text.

4. The method of claim 3 wherein the definition of the set of words and the association of each word to a specific key are dynamically changed during the input of the text, further according to a second parameter, the second parameter being dependent by the length of the words.

5. The method of claim 3 wherein each one of the plurality of keys $k_i$ is mapped on a Cartesian reference system and is associated to a pair of coordinates $(x_i, y_i)$ of the Cartesian reference system, the plurality of keys being ideally divided into a first and a second set of keys, the first set of keys having the x-coordinates less than a predetermined threshold h and the second set of keys having the x-coordinate greater than the predetermined threshold h, each word $W_j$ having a difficulty value $D(W_j)$ defined as:

$$D(W_j)=SUM(move(c_i, c_{i+1})) \text{ with } i=1 \text{ to } n$$

where the function $move(k_1, k_2)$ is:

| | |
|---|---|
| $= sqrt((x_2 - x_1)^2 + (y_2 - y_1)^2) + 1$ | if $(x_2 - h)*(x_1 - h) > 0$ |
| $= 1$ | if $(x_2 - h)*(x_1 - h) < 0$ | said second parameter being dependent from said difficulty value.

6. A word processing system for dynamically creating a most frequently used word list for outputting text, comprising:

input means having a plurality of keys $k_i$ for inputting text, the text being in a form of a sequence of words $w_j=(c_1, c_2, \ldots, c_n)$;

means for dynamically defining, according to at least one variable parameter, a limited set of words in said text as said text is being inputted;

means for associating each word of the limited set of words to a specific key; and means for dynamically changing said associating as said limited set of words changes in accordance with said at least one variable whereas one of the specfic keys is used to output the word associated therewith.

7. The system of claim 6 further comprising display means for displaying the set of words associated to specific keys.

8. The system of claim 6 wherein the at least one parameter comprises the frequency of the words in the text.

9. The system of claim 8 wherein the definition of the set of words and the association of each word to a specific key are dynamically changed during the input of the text, further according to a second parameter, the second parameter being dependent by the length of the words.

10. The system of claim 8 wherein each one of the plurality of keys $k_i$ is mapped on a Cartesian reference system and is associated to a pair of coordinates $(x_i, y_i)$ of the Cartesian reference system, the plurality of keys being ideally divided into a first and a second set of keys, the first set of keys having the x-coordinates less than a predetermined threshold h and the second set of keys having the x-coordinate greater than the predetermined threshold h, each word $W_j$ having a difficulty value $D(W_j)$ defined as:

$$D(W_j)=SUM(move(c_i, c_{i+1})) \text{ with } i=1 \text{ to } n$$

where the function $move(k_1, k_2)$ is:

| | |
|---|---|
| $= sqrt((x_2 - x_1)^2 + (y_2 - y_1)^2) + 1$ | if $(x_2 - h)*(x_1 - h) > 0$ |
| $= 1$ | if $(x_2 - h)*(x_1 - h) < 0$ | said second parameter being dependent from said difficulty value.

* * * * *